(12) United States Patent
Sanchez et al.

(10) Patent No.: US 9,329,098 B2
(45) Date of Patent: May 3, 2016

(54) METHOD AND OPTICAL SHIELD FOR DETECTING TAMPERING

(71) Applicant: OPTICALLOCK, INC., La Mesa, CA (US)

(72) Inventors: Jorge Sanchez, Poway, CA (US); Carol E. Fuller, Santee, CA (US)

(73) Assignee: OpticalLock, Inc., La Mesa, CA (US)

( * ) Notice: Subject to any disclaimer, the term of this patent is extended or adjusted under 35 U.S.C. 154(b) by 0 days.

(21) Appl. No.: 14/178,724

(22) Filed: Feb. 12, 2014

(65) Prior Publication Data

US 2015/0226637 A1    Aug. 13, 2015

Related U.S. Application Data

(60) Provisional application No. 61/860,733, filed on Jul. 31, 2013.

(51) Int. Cl.
| | |
|---|---|
| G08B 13/18 | (2006.01) |
| G01M 11/00 | (2006.01) |
| G08B 13/186 | (2006.01) |
| G01M 11/08 | (2006.01) |

(52) U.S. Cl.
CPC ............ G01M 11/30 (2013.01); G01M 11/088 (2013.01); G08B 13/186 (2013.01)

(58) Field of Classification Search
CPC .............................. G08B 13/186; G01M 11/30
See application file for complete search history.

(56) References Cited

U.S. PATENT DOCUMENTS

| | | | | |
|---|---|---|---|---|
| 3,854,792 A * | 12/1974 | Koelle | ................. | G09F 3/0376 385/115 |
| 4,447,123 A * | 5/1984 | Page | .................... | G02B 6/2804 250/227.15 |
| 4,688,891 A * | 8/1987 | Carratt | ................ | G02B 6/4469 385/115 |
| 5,104,391 A * | 4/1992 | Ingle | ..................... | A61B 18/20 250/227.15 |
| 5,592,149 A | 1/1997 | Alizi | | |
| 6,304,713 B1 * | 10/2001 | Isogai | ..................... | G06K 9/00 250/227.15 |
| 6,420,971 B1 * | 7/2002 | Leck | ....................... | E05B 39/04 340/542 |
| 7,471,203 B2 * | 12/2008 | Worthy | ............. | G08B 13/1445 340/556 |
| 7,482,924 B1 * | 1/2009 | Beinhocker | ......... | G08B 13/186 250/227.14 |
| 8,982,360 B2 * | 3/2015 | Zhao | ..................... | G08B 13/08 356/614 |
| 2006/0083458 A1 * | 4/2006 | Iffergan | ......................... | 385/13 |
| 2010/0014071 A1 * | 1/2010 | Hartog | ........................ | 356/73.1 |

* cited by examiner

*Primary Examiner* — Charlie Y Peng
(74) *Attorney, Agent, or Firm* — Knobbe Martens Olson & Bear LLP

(57) ABSTRACT

A method includes conforming an arrangement of an optical fiber to an object to detect tampering with the object when the optical fiber arrangement is changed, measuring an optical signature of the optical fiber arrangement in a first measurement, measuring the optical signature of the optical fiber arrangement at a time after the first measurement in a second measurement, and comparing the first and second measurements to detect tampering with the object from a change in the optical fiber arrangement. In another embodiment, an optical shield includes an optical fiber arranged to detect tampering with an object resulting from a change in the optical fiber arrangement and an optical fiber carrier coupled to the optical fiber for conforming the optical fiber arrangement to the object.

18 Claims, 10 Drawing Sheets

US 9,329,098 B2

METHOD AND OPTICAL SHIELD FOR DETECTING TAMPERING

CROSS-REFERENCE TO RELATED APPLICATIONS

This application claims the benefit of U.S. Provisional Application No. 61/860,733, filed 31 Jul. 2013, incorporated herein in its entirety.

BACKGROUND OF THE INVENTION

1. Field of the Invention

The embodiments disclosed herein relate generally to the detection of counterfeit products including, but not limited to, electronic systems and components, mechanical parts, medicines, chemicals, and cosmetics. More specifically, the disclosed embodiments relate to the protection of products from tampering after manufacture by detecting whether the products have been tampered with or substituted with a counterfeit.

2. Description of Related Art

Globalization of product manufacturing has brought a significant challenge to consumers from the many products substituted by counterfeits during and after manufacture in the supply chain and during transit to a warehouse or distribution center. The counterfeit products may not perform as intended, causing significant financial losses, jeopardizing national security, and endangering personal health. Counterfeiters attack the supply chain for products such as electronic parts and systems, mechanical parts, perfumes and cosmetics, and medicines. Some of the worst examples are counterfeit medicines which can be substituted with chemicals that result in life threatening consequences, machine bolts used in critical structures such as bridges and aircraft, fire extinguishers containing compressed air that may fail in emergency situations, and electronic parts installed in defense systems that may reduce reliability and performance, causing life threatening situations. The manufacture and distribution of medicines are also subject to life-threatening consequences from counterfeiting. Medicines and drugs are typically placed in capped containers sealed with a plastic wrapper that is shrunk tightly around the cap and the container. Counterfeiters can remove the seal, replace the contents of the containers, reproduce the plastic wrapper, and reseal the container without leaving visual signs of tampering.

SUMMARY OF THE INVENTION

In various embodiments described below, an optical shield includes an optical fiber arranged to detect tampering with an object resulting from a change in the optical fiber arrangement and an optical fiber carrier coupled to the optical fiber for conforming the optical fiber arrangement to the object.

In one embodiment, a method includes conforming an arrangement of an optical fiber to an object to detect tampering with the object when the optical fiber arrangement is changed, measuring an optical signature of the optical fiber arrangement in a first measurement, measuring the optical signature of the optical fiber arrangement at a time after the first measurement in a second measurement, and comparing the first and second measurements to detect tampering with the object from a change in the optical fiber arrangement.

BRIEF DESCRIPTION OF THE DRAWINGS

The above and other aspects, features and advantages will become more apparent from the description in conjunction with the following drawings presented by way of example and not limitation, wherein like references indicate similar elements throughout the several views of the drawings.

Figure 1:
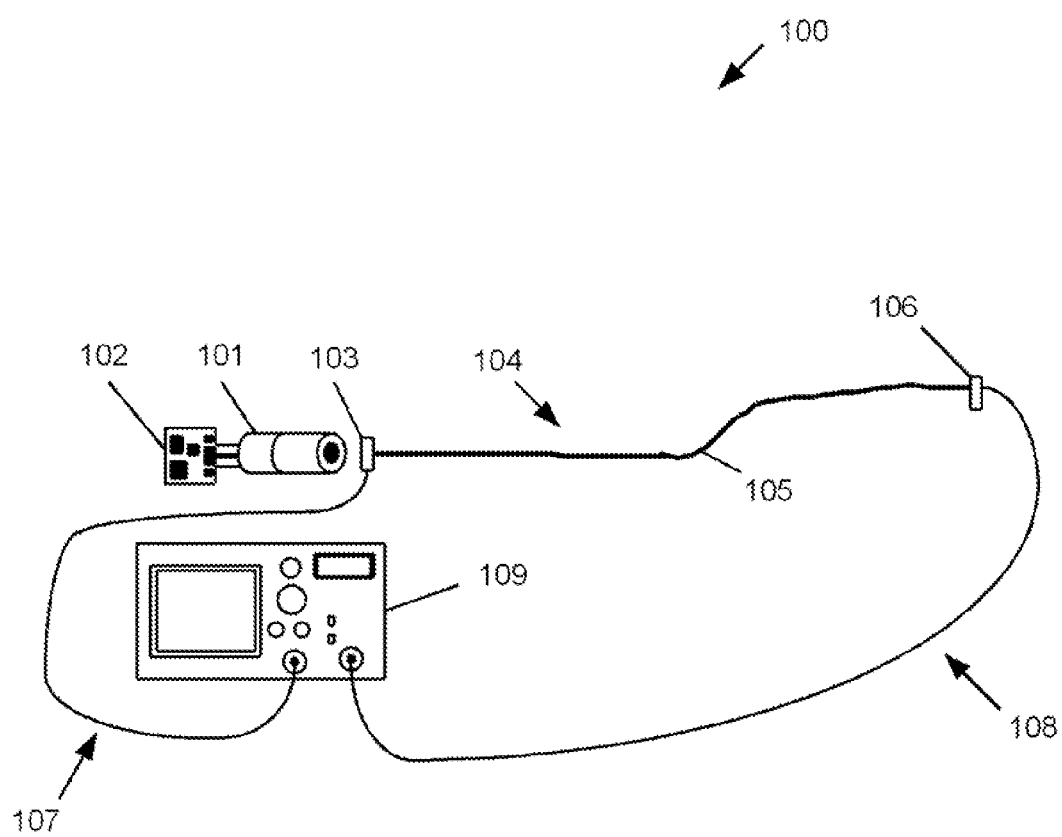
FIG. 1 illustrates an example of a frequency domain measurement performed on an optical fiber.

Elements in the figures are illustrated for simplicity and clarity and have not necessarily been drawn to scale. For example, the dimensions, sizing, and/or relative placement of some of the elements in the figures may be exaggerated relative to other elements to clarify distinctive features of the illustrated embodiments. Also, common but well-understood elements that may be useful or necessary in a commercially feasible embodiment are often not depicted to facilitate a less obstructed view of the illustrated embodiments.

DETAILED DESCRIPTION OF THE ILLUSTRATED EMBODIMENTS

The following description of the illustrated embodiments is not intended to limit either the number or the variety of embodiments within the scope of the claims, rather to teach by specific examples the general principles that are incorporated in several preferred embodiments. For example, certain actions or steps may be described or depicted in a specific order to be performed. However, practitioners of the art will understand that the specific order is only given by way of example and that the specific order does not exclude performing the described steps in another order to achieve substantially the same result. Also, the terms and expressions used in the description have the ordinary meanings accorded to such terms and expressions in the corresponding respective areas of inquiry and study except where other meanings have been specifically set forth herein.

Fiber optic cables containing optical fibers are used to conduct light from a light source over a distance. The light received from an end of the optical fiber at a definite time, referred to herein as an optical response, is a function of the physical properties of the optical fiber and the type of light source used to transmit light through the optical fiber. For example, an optical fiber may be single-mode or multi-mode. A multi-mode optical fiber has a much larger core diameter than a single-mode optical fiber, typically 50 to 100 micrometers, much larger than the wavelength of the light conducted through it. Because of the large core diameter, a multi-mode optical fiber has higher light-gathering capacity than single-mode fiber. In practical terms, the larger core size simplifies connections and also allows the use of lower-cost electronics such as light-emitting diodes (LEDs) and vertical-cavity surface-emitting lasers (VCSELs) which operate at the 850 nanometer or the 1300 nanometer wavelength, while a single-mode optical fiber used in telecommunications typically operates at the 1310 nanometer or the 1550 nanometer wavelength and requires more expensive laser sources. The LED light sources sometimes used with multi-mode optical fibers produce a range of wavelengths that propagate through the optical fiber at different speeds. The light source used to measure the optical response may be, for example, an LED light source or a laser light source having a fixed wavelength or a tunable wavelength. In various embodiments, the light from the light source includes one or more of amplitude modulation, frequency modulation, timed pulses, multiple wavelengths, and polarization.

In embodiments described below, the variation of the optical response as a function of the arrangement of the optical fiber, although generally regarded as unwanted distortion of the input signal, is advantageously exploited to detect small variations in the arrangement of the optical fiber. The arrangement of the optical fiber includes bending and curvature, cracks, compression, strain, and other physical properties of the optical fiber. Examples of the optical response of an optical fiber that may be measured are bending loss, fracture reflections, chromatic dispersion, modal dispersion, polarization mode dispersion, and four-wave mixing mode dispersion. These optical responses are generally regarded as unwanted anomalies and distortions in fiber optic signal applications. However, one or more of these optical responses are advantageously included in the optical signature of the optical fiber in various embodiments described below.

Measurements of the optical signature constitute a characteristic profile that is unique to each optical fiber and its arrangement at a given time. The arrangement of the optical fiber includes bends and curves formed in the optical fiber and other physical properties of the optical fiber including cladding material, cracks, and transmission modes.

Bends in an optical fiber affect the light power as a function of wavelength in the optical response. As the radius of curvature of a bend becomes smaller, the light power is subjected to greater attenuation. Typical losses in single-mode fibers are −2.6 dB at a wavelength of 1550 nm for a bend radius of 1.15 cm. Because loss of light power is generally regarded as undesired in fiber optic applications, bending, especially bending with small radii, is generally avoided. In various embodiments, however, bends and especially bends with small radii are advantageously exploited to increase the sensitivity of an optical fiber to tampering. The light power in each of the wavelengths in the optical response spectrum varies with the location and curvature of the bend and is measured, for example, with an optical spectral analyzer.

FIG. 1 illustrates an example of a frequency domain measurement 100 performed on an optical fiber. Shown in FIG. 1 are a semiconductor laser 101, laser driver electronics 102, a beam splitter 103, an optical fiber 104, a bend 105, a fiber optic connector 106, an input optical response fiber 107, an output optical response fiber 108, and an optical spectral analyzer 109.

In FIG. 1, light from the semiconductor laser 101 is generated with appropriate drive current and control from the laser driver electronics 102. The light from the semiconductor laser 101 is directed partly into the optical fiber 104 and partly into the input optical response fiber 107 by the beam splitter 103. The fiber optic connector 106 facilitates connecting the optical fiber 104 to the output optical response fiber 108.

The input optical response fiber 107 conducts a portion of the light from the semiconductor laser 101 to a first channel of the optical spectral analyzer 109, and the output optical response fiber 108 conducts the optical response from the optical fiber 104 to a second channel of the optical spectral analyzer 109. The optical spectral analyzer 109 measures and displays the light power from the semiconductor laser 101 and the optical response from the optical fiber 108 as a function of wavelength (or frequency).

Figure 2:
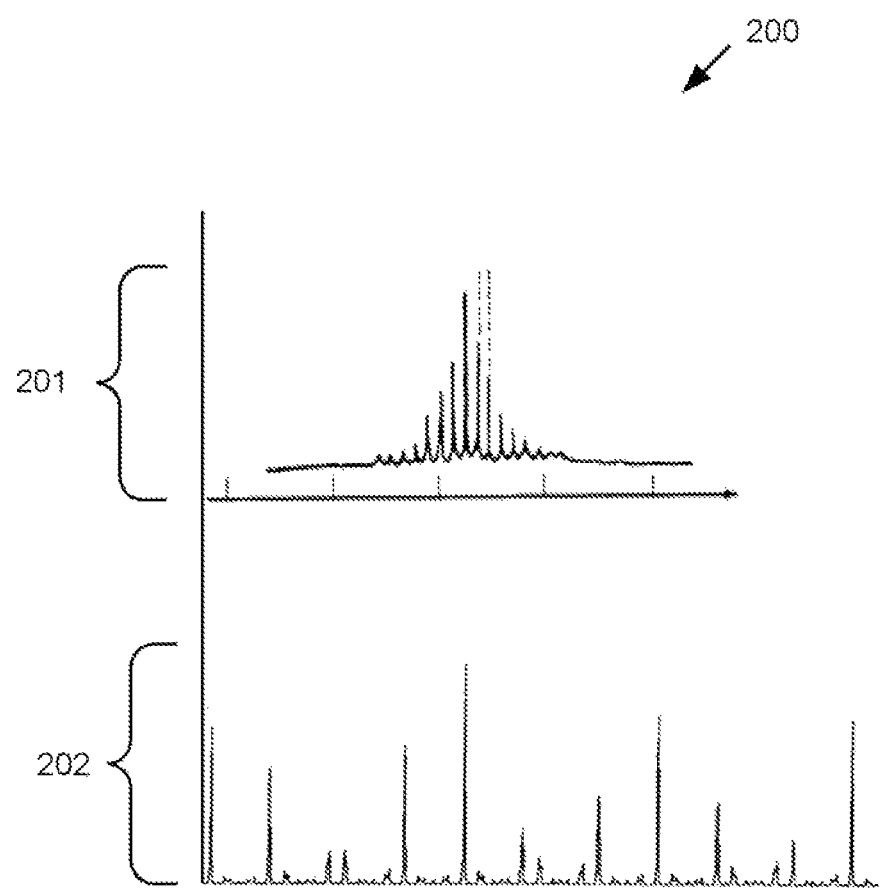
FIG. 2 illustrates a display of the frequency domain measurement in FIG. 1.

FIG. 2 illustrates a display 200 of the frequency domain measurement in FIG. 1. Shown in FIG. 2 are an input light spectrum 201 and an optical response spectrum 202.

In FIG. 2, the vertical axis represents light power, and the horizontal axis represents wavelength (or frequency). The light power for a given time period in each of the wavelengths in the optical response spectrum varies with the location and curvature of the bend 105 in the optical fiber 104.

Fractures or cracks in an optical fiber cause one portion of the light conducted in an optical fiber to be transmitted in the forward direction and another portion to be reflected back to the light source at times that correspond to the distance of the cracks from the light source. For example, an optical fiber may be intentionally or unintentionally cracked in various locations along the optical fiber. Because reflections typically result in distortions of an input signal, fractures are generally avoided in fiber optic applications. In various embodiments, however, fractures in an optical fiber are advantageously exploited to increase the sensitivity of the optical fiber to tampering.

Figure 3:
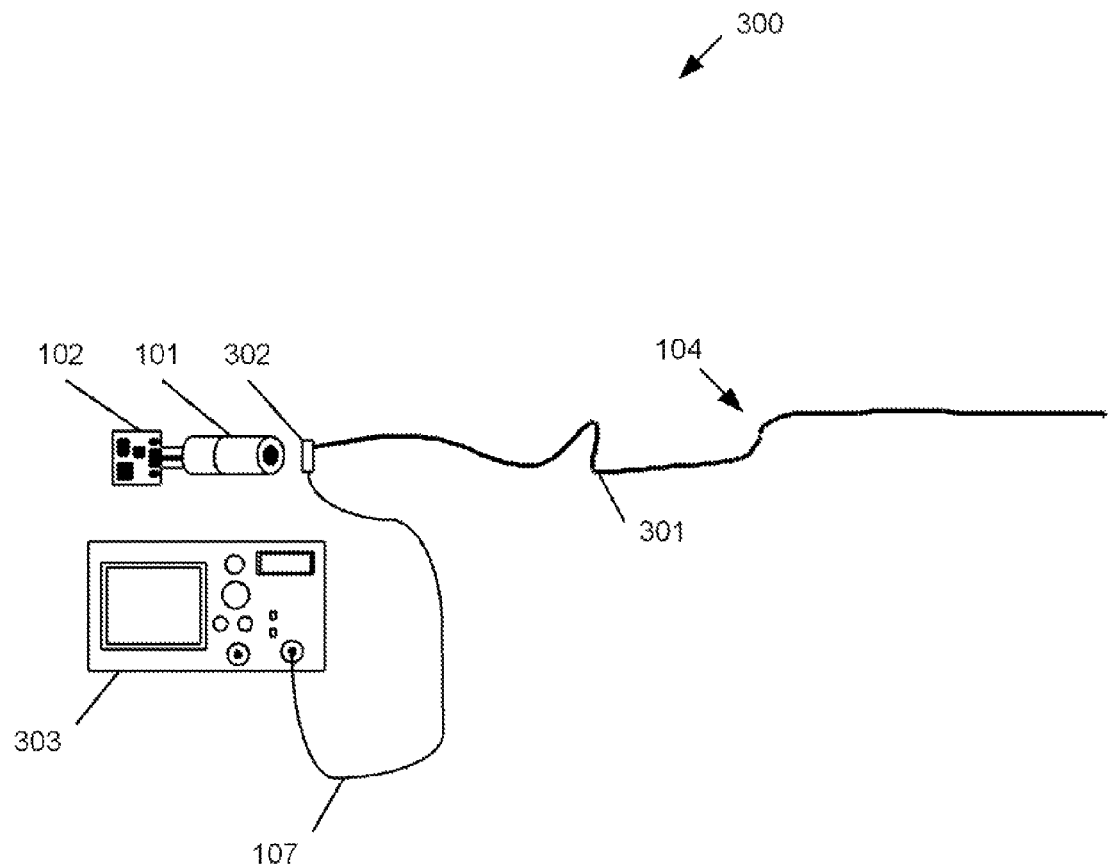
FIG. 3 illustrates an example of a time domain measurement performed on an optical fiber.

FIG. 3 illustrates an example of a time domain measurement 300 performed on an optical fiber. Shown in FIG. 3 are a semiconductor laser 101, laser driver electronics 102, an optical fiber 104, an input optical response fiber 107, a crack 301, a laser adapter 302, and an optical time domain reflectometer 303.

In FIG. 3, light from the semiconductor laser 101 is generated with appropriate drive current and control from the laser driver electronics 102. The semiconductor laser 101 produces a beam of light that is directed into the optical fiber 104 via the laser adapter 302. The laser adapter 302 contains a bidirectional optical coupler and a collimator. The collimator aligns the light beam parallel to the input end of the optical fiber 104. The bidirectional coupler directs light from the semiconductor laser 101 into the optical fiber 104 and directs reflected light received from the optical fiber 104 into the input optical response fiber 107. The laser adapter 302 also directs a portion of the light beam from the semiconductor laser 101 into the input optical response fiber 107. The input optical response fiber 107 conducts the optical response from the optical fiber 104 and the portion of the light beam from the semiconductor laser 101 to the optical time domain reflectometer 303. The optical time domain reflectometer 303 displays the light power received from the input optical response fiber 107 as a function of time.

The light from the semiconductor laser 101 interacts with the crack 301, causing a portion of the light to be reflected back to the laser adapter 302. When light propagates in a medium such as the optical fiber 104, a physical discontinuity in the medium such as the crack 301 results in a change in characteristic impedance of the optical fiber 104. The change in characteristic impedance of the optical fiber 104 causes one portion of the light from the semiconductor laser 101 to be transmitted in the forward direction and another portion to be reflected back to the laser adapter 302.

Figure 4:
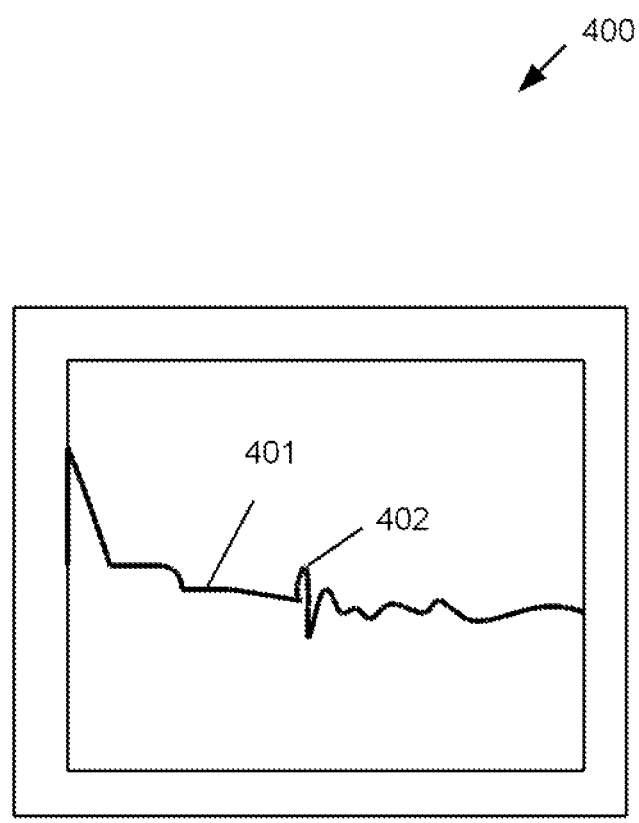
FIG. 4 illustrates a display of the time domain measurement in FIG. 3.

FIG. 4 illustrates a display 400 of the time domain measurement in FIG. 3. Shown in FIG. 4 are an input light pulse power level 401 and a reflected light pulse power level 402.

In FIG. 4, the vertical axis represents light power, and the horizontal axis represents time. The reflected light from the crack 301 in the optical fiber 104 takes time to return to the laser adapter 302. Accordingly, the optical time domain reflectometer 303 displays the light power from the semiconductor laser 101 as the input light pulse power level 401 followed by the reflected light pulse power level 402 from the crack 301. If the optical fiber 104 contains more than one crack, then more reflections are displayed on the optical time domain reflectometer 303. In various embodiments, one or more time domain measurements of the optical response displayed on the optical time domain reflectometer 303 are included in the measurement of the optical signature of the optical fiber 104.

Further information related to bend loss, cracking, crack displacement and crack angle, reflections, and other effects in an optical fiber are discussed in a research paper by Joram Vishlizki, Jan. 1, 1992, "Crack detection with a fiber optic sensor: a parametric study of the orientation angle approach", Theses and Dissertations, Paper 90, Lehigh University, incorporated in its entirety in this application by reference.

The optical response of the optical fiber 104 may also include dispersion. For example, chromatic dispersion results from a variation in the propagation speed of light in the optical fiber as a function of the light wavelength due to the composition of the material used to make the optical fiber and the distribution of light power between the core and the cladding of the optical fiber. Consequently, the pulse width of a light pulse that includes multiple wavelengths increases as the light pulse propagates through the optical fiber. As a result, input signals containing short pulses will be distorted as the input signal pulse widens and separates into a pulse train. Because chromatic dispersion typically results in distortion of an input signal, chromatic dispersion is generally regarded as undesirable in fiber optic applications. In various embodiments, however, chromatic dispersion in an optical fiber is advantageously exploited to increase the sensitivity of the optical fiber to tampering.

Figure 5:
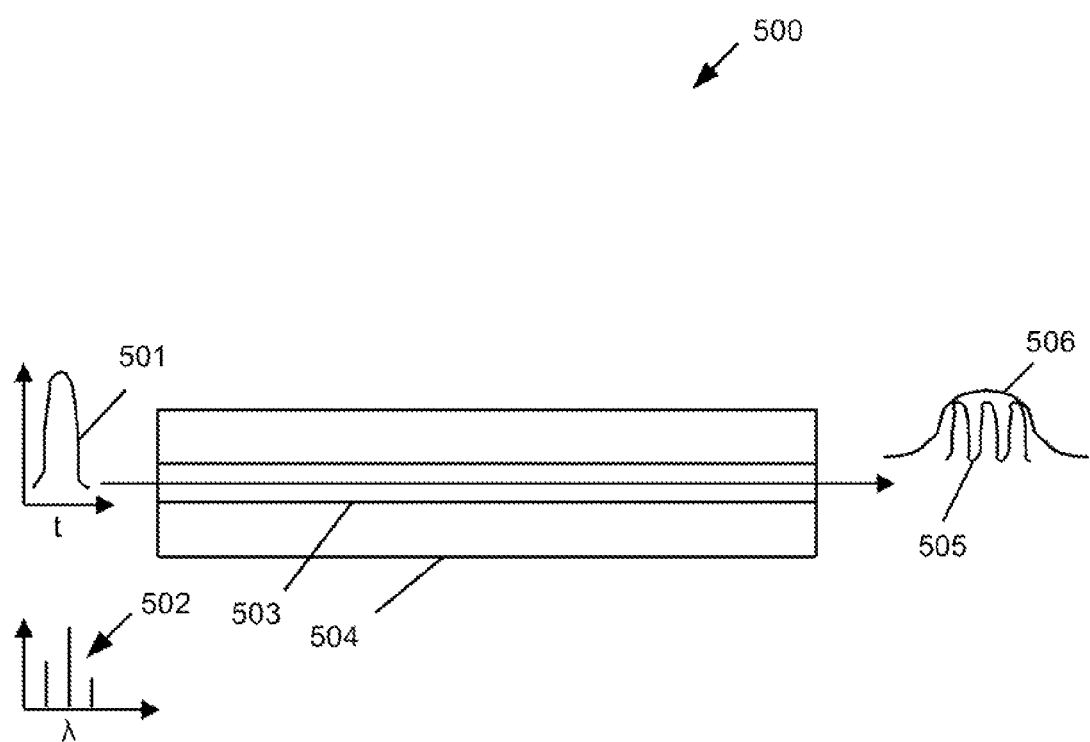
FIG. 5 illustrates dispersion in an optical fiber.

FIG. 5 illustrates dispersion 500 in an optical fiber. Shown in FIG. 5 are an input light pulse 501, an input spectrum 502, an optical fiber core 503, optical fiber cladding 504, multiple arrival pulses 505, and an output light pulse envelope 506.

In FIG. 5, the input light pulse 501 is generated, for example, by a semiconductor light source as described above. The input light pulse 501 contains multiple wavelengths represented by the input spectrum 502 that coincide in time. As the input light pulse 501 propagates through the optical fiber core 503, the individual wavelengths in the input light pulse 501 travel at different speeds due to chromatic dispersion. As a result, the individual wavelengths separate into the multiple arrival pulses 505. If there is only a short separation in time between the multiple arrival pulses 505, the multiple arrival pulses 505 superimpose to form the output light pulse envelope 506. The width of the input light pulse 501 and the width of the output light pulse envelope 505 may be measured, for example, by the optical time domain reflectometer 303 in FIG. 3.

The optical response of an optical fiber may also include modal dispersion, that is, the propagation speed of light in the optical fiber varies as a function of the angle of incidence of light from a light source into the optical fiber and the distribution of light power between the core and the cladding of the optical fiber. Consequently, the pulse width of a light pulse that includes multiple angles of incident light power or modes increases as the light pulse propagates through the optical fiber. As a result, input signals containing short pulses will be distorted as the input signal pulse separates into a pulse train. Because modal dispersion typically results in distortion of an input signal, modal dispersion is generally regarded as undesirable in fiber optic applications. In various embodiments, however, modal dispersion in an optical fiber is advantageously exploited to increase the sensitivity of the optical fiber to tampering. In one embodiment, a focusing lens is inserted after the light source to produce light power with multiple angles of incidence to measure the optical signature of the optical fiber.

The optical response of an optical fiber may also include polarization mode dispersion, that is, the propagation speed of light in the optical fiber varies as a function of the polarization angle of the incident light. For example, if light is polarized by the input light source into a vertical polarized component and a horizontal polarized component, each polarized component propagates at a different speed through the optical fiber. Consequently, the pulse width of a polarized light pulse increases as the light pulse propagates through the optical fiber, eventually separating into multiple pulses. As a result, signals containing short pulses will be distorted as the polarized components separate inside the optical fiber. Because polarization mode dispersion typically results in distortion of an input signal, polarization mode dispersion is generally regarded as undesirable in fiber optic applications. In various embodiments, however, polarization mode dispersion in an optical fiber is advantageously exploited to increase the sensitivity of the optical fiber to tampering.

The optical response of an optical fiber may also include four-wave mixing mode dispersion. As explained in a research paper by Aso, O., Tadakuma, M., and Namiki, S., "Four-Wave Mixing in Optical Fibers and Its Applications", 2000, Furukawa Review, No. 19, four-wave mixing (FWM) occurs when light having two or more different wavelengths is launched into an optical fiber and is divided into additional wavelengths. When light of three different wavelengths is launched into an optical fiber, a fourth wavelength is produced that does not coincide with any of the first three wavelengths. As a consequence of four-wave mixing, the pulse width of the input signal increases as each wavelength in the light pulse propagates through the optical fiber at a different speed, eventually separating the light pulse into multiple light pulses. As a result, input signals containing short pulses will be distorted as the input signal pulse widens and separates into a pulse train. Because four-wave mixing mode dispersion typically results in distortion of an input signal, four-wave mixing mode dispersion is generally regarded as undesirable in fiber optic applications. In various embodiments, however, four-wave mixing mode dispersion in an optical fiber is advantageously exploited to increase the sensitivity of the optical fiber to tampering.

The optical signature includes the response of the optical fiber to at least one of bending, fracturing, chromatic dispersion, modal dispersion, polarization mode dispersion, and four-wave mixing mode dispersion. In various embodiments, one or more measurements of the optical response described above as well as variations and equivalents thereof are advantageously incorporated in a method to detect a change in the arrangement of an optical fiber. In further embodiments, the light from the light source is measured and included in the measurement of the optical signature.

Figure 6:
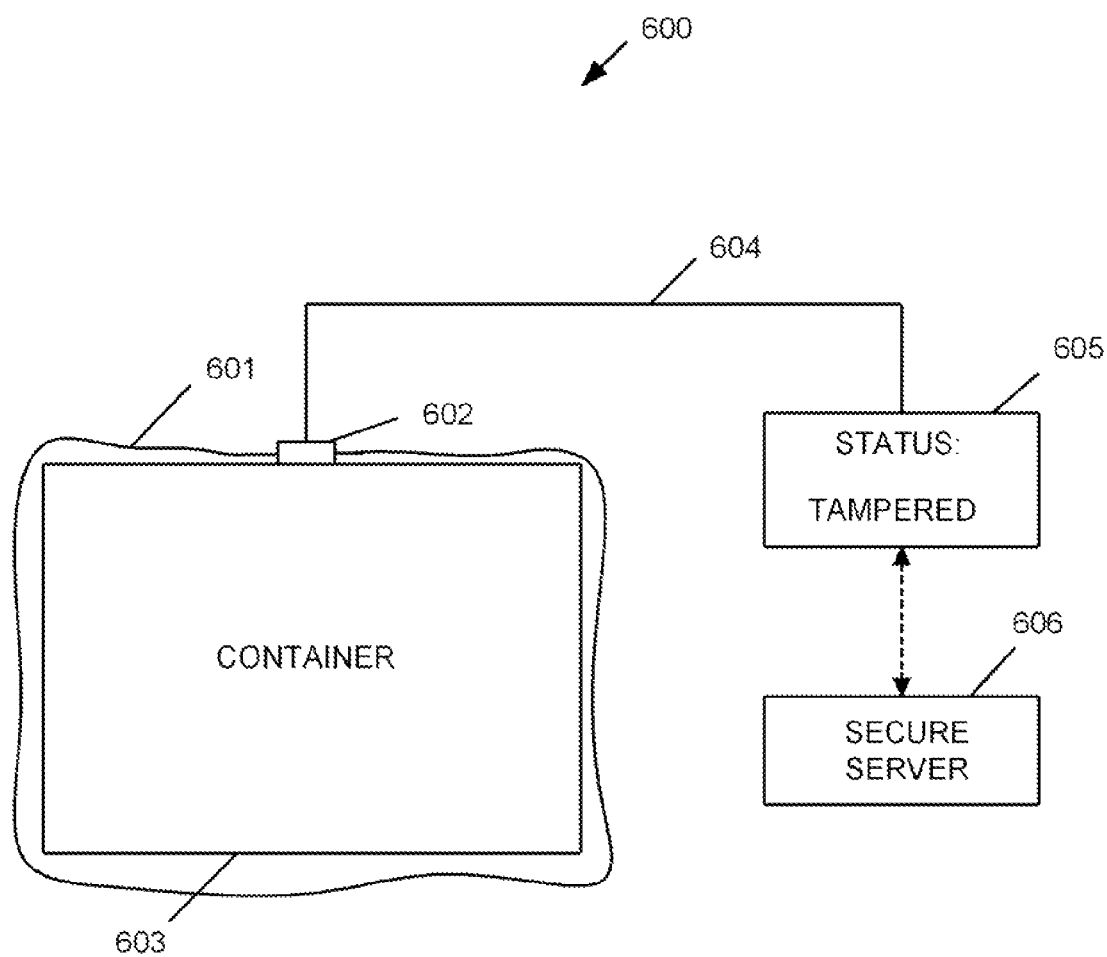
FIG. 6 illustrates an arrangement of an optical fiber for detecting tampering.

FIG. 6 illustrates an arrangement 600 of an optical fiber for detecting tampering. Shown in FIG. 6 are an optical fiber 601, an optical coupler 602, a container 603, an input optical fiber 604, an optical signature tester 605, and a secure server 606.

In FIG. 6, the optical fiber 601 is fastened to the container 603. In various embodiments, the container 603 is any type of object used to package or store a solid, a liquid, or a gas. In other embodiments, the container 603 is a fixed storage container, such as a building or a vault, or any commodity for which tampering detection is desired. In one embodiment, the container 603 is a document, for example, a binder containing confidential information. When the container 603 is tampered with to gain access to its contents, the arrangement of the optical fiber 601 is changed, for example, by moving at least a portion of the optical fiber 601 to access the contents of the container 603. The change in the arrangement of the optical fiber 601 results in a change in the optical signature of the optical fiber 601.

The optical signature is measured via the optical coupler 602 and the input optical fiber 604 by the optical signature tester 605, for example, according to one or more of the methods for measuring the optical response described above. The optical signature tester 605 compares the measurement of the optical signature to an earlier measurement of the optical signature of the optical fiber 601 made, for example, before the container 603 was shipped to its current location. In one embodiment, the earlier measurement is recorded on the secure server 606 over the Internet, and the optical signature tester 605 retrieves the earlier optical signature over the Internet from the secure server 606. If the comparison of the measurements results in a difference, for example, exceeding a threshold allowing for measurement error and environmental variables, the optical signature tester 605 generates a tampering indicator. In this example, the tampering indicator is the visual true/false warning, "STATUS: TAMPERED".

In one embodiment, an optical shield includes an optical fiber arranged to detect tampering with an object resulting from a change in the optical fiber arrangement and an optical fiber carrier coupled to the optical fiber for conforming the optical fiber arrangement to the object.

Figure 7:
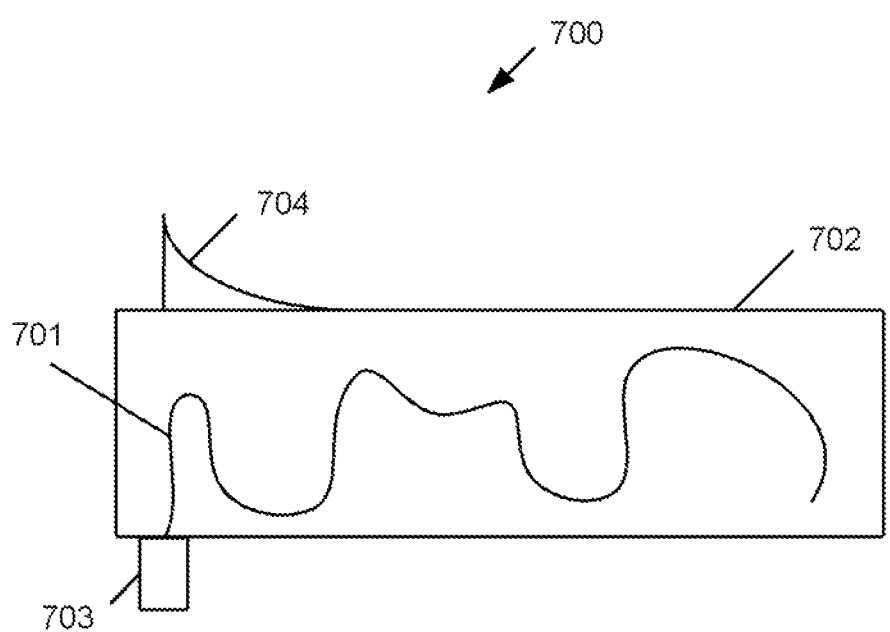
FIG. 7 illustrates an embodiment of an optical shield for detecting tampering including an optical fiber carrier made of tape.

FIG. 7 illustrates an embodiment of an optical shield 700 for detecting tampering including an optical fiber carrier made of tape. Shown in FIG. 7 are an optical fiber 701, an optical fiber carrier 702, an optical fiber coupler 703, and a removable backing 704.

In FIG. 7, the optical fiber carrier 702 is made of a plastic, paper, or other type of flexible tape shaped to fit a specific application to practice various embodiments within the scope of the claims. In various embodiments, the optical fiber 701 is a multi-mode optical fiber or a single-mode optical fiber. In one embodiment, the optical fiber carrier 702 is a length of tape having an adhesive coating on at least one side to fasten the optical fiber 701 to an object. The length of the optical fiber 701 arranged on the optical fiber carrier 702 is selected according to the application and the precision of the equipment used to measure the optical signature of the optical fiber 701. In various embodiments, the optical fiber 701 has a length between 10 m and 30 m. The optical fiber 701 is arranged on the optical fiber carrier 702, for example, by applying an adhesive to the optical fiber 701 and bonding the optical fiber 701 to the tape or by laminating the optical fiber 701 between two layers of tape according to well known manufacturing techniques. In various embodiments, other methods are used to bond the optical fiber 701 to the optical fiber carrier 702 according to well known techniques.

In one embodiment, the optical fiber carrier 702 is covered on at least one side by the removable backing 704 according to well known techniques to protect the optical shield 700 from handling damage and from adhering to an object unintentionally. In various embodiments, the removable backing 704 is made of plastic, paper, or other material that is peeled away and discarded when the optical shield 700 is applied to an object, for example, to a package or a medicine container. In other embodiments, the optical fiber 701 is embedded in the tape without the removable backing 704. In further embodiments, the optical fiber coupler 703 includes a fiber optic connector terminating one end or each end of the optical fiber 701. The optical fiber coupler 703 facilitates connecting and disconnecting an optical signature measurement device to the optical shield 700 for measuring the optical signature of the optical fiber 701 as described above in FIGS. 1-5.

In various embodiments, the optical fiber carrier 702 is made of tape, bubble wrap, sheet wrap, shrink wrap, expanding foam, plastic air bags, pellets, paper, or cardboard and bonded to the optical fiber 701 in the same manner described above. In one embodiment, the optical fiber carrier 702 is an adhesive that is poured, sprayed, or otherwise applied to the optical fiber 701 to fasten the optical fiber 701 to an object. In further embodiments, the optical fiber carrier 702 is made of other materials to suit specific applications within the scope of the claims.

In one embodiment, the optical fiber 701 is arranged in a series of curves on the optical carrier 702. The optical fiber carrier 702 conforms the arrangement of the optical fiber 701 to an object when the optical fiber carrier 702 is fastened to the object, that is, the optical fiber carrier 702 imparts a shape to the optical fiber arrangement similar to the shape of the object. In another embodiment, the optical fiber 701 is arranged in a single curve, for example, a spiral.

In various embodiments, the optical fiber carrier 702 is fastened to a seam of a regular slotted container or around a junction of a medicine bottle and a bottle cap. In various embodiments, conforming the arrangement of the optical fiber 701 to an object includes bending the optical fiber 701. For example, in embodiments including a shrink wrap as the optical fiber carrier 702, heating the shrink wrap bends the optical fiber 701 to conform to the shape of the object as the shrink wrap fastens to the object.

The arrangement of the optical fiber 701 in a series of curves advantageously increases the area coverage in which changing the optical signature of the optical fiber 701 is unavoidable when an attempt is made to gain unauthorized access to the object, for example, by removing at least a portion of the optical carrier 702 from the object.

Figure 8:
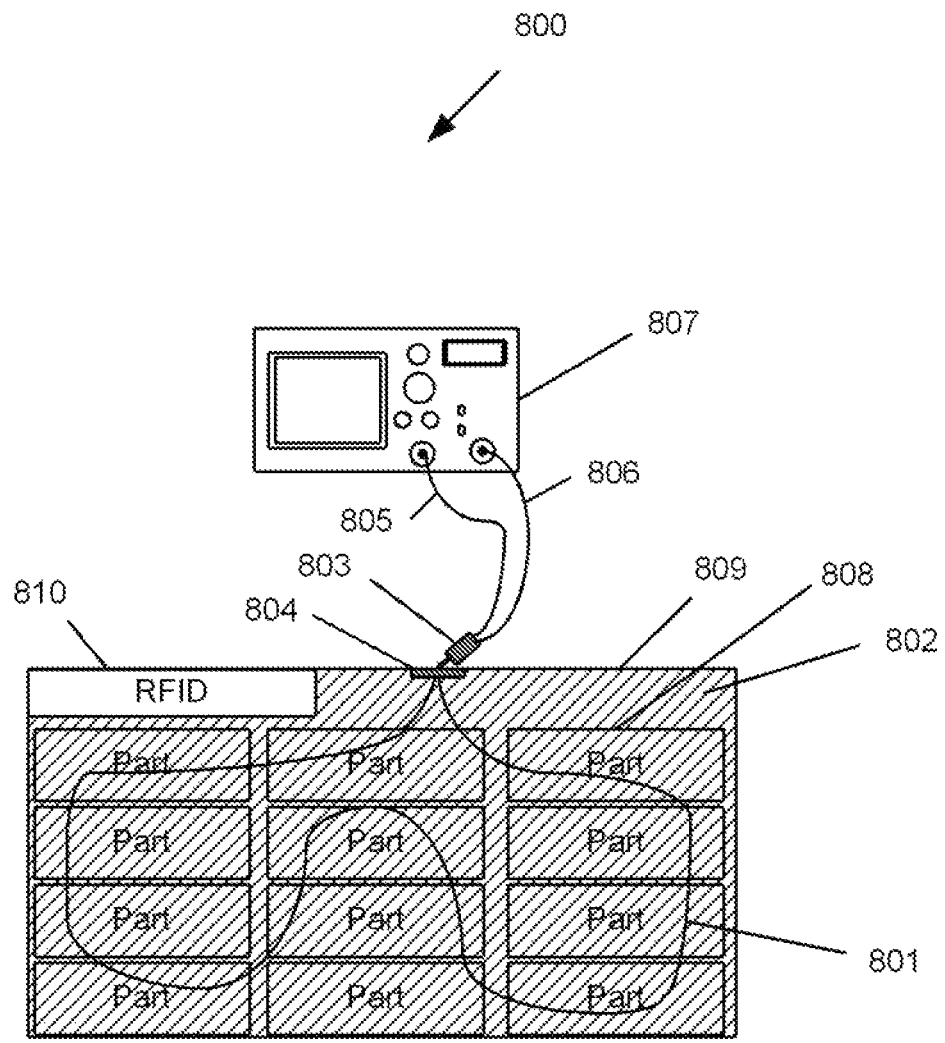
FIG. 8 illustrates an embodiment of an optical shield with an optical signature measuring device to detect tampering in a shipment of parts.

FIG. 8 illustrates an embodiment of an optical shield 800 with an optical signature measuring device to detect tampering in a shipment of parts. Shown in FIG. 8 are an optical fiber 801, an optical fiber carrier 802, an optical coupler 803, an optical fiber termination pad 804, a first optical response fiber 805, a second optical response fiber 806, an optical signature measuring device 807, inner packages 808, an outer package 809, and an RFID tag 810.

In FIG. 8, the optical fiber 801 is a single-mode or a multi-mode optical fiber. In one embodiment, the optical fiber carrier 802 is a sheet wrapper commonly used to secure boxes to pallets, or skids. The optical fiber 801 is fastened to the optical fiber carrier 802, for example, by bonding or laminating the optical fiber 801 to the optical fiber carrier 802 as described above with reference to FIG. 7. In various embodiments, the optical fiber 801 is arranged in a series of curves on the optical fiber carrier 802 to produce an optical signature of the optical fiber 801 that changes when the arrangement of the optical fiber 801 around the inner packages 808 is changed, for example, by bending or flexing the optical fiber carrier 802 during an attempt to gain unauthorized access to the inner packages 808.

In one embodiment, the optical fiber carrier 802 is wrapped around the inner packages 808 inside the outer package 809 to conform the optical fiber 801 to the inner packages 808. The inner packages 808 contain, for example, a shipment of parts manufactured by a factory for a customer. The outer package 809 protects the inner packages 808 and keeps them together during shipment.

In another embodiment, the optical fiber 801 is arranged in an oscillating curve around the inner packages 808, and the optical carrier 802 is made by expanding foam inside the outer box 809 against the optical fiber 801. The expanding foam conforms the optical fiber 801 to the inner packages 808. In a further embodiment, the optical fiber carrier 802 is a plastic air bag, and the optical fiber 801 is bonded to a surface of the plastic air bag. The air bag is inserted inside the outer package 809 to protect the inner packages 808 during shipment. In another embodiment, the optical fiber carrier 802 is an adhesive tape, and the optical fiber 801 is bonded to the adhesive tape according to well known techniques. In various embodiments, the adhesive tape is fastened to the seams of the outer package 809 or applied as a liner to the inside of the outer package 809. In a further embodiment, the optical fiber carrier 802 is a bubble wrap, and the optical fiber 801 is bonded to the bubble wrap according to well known techniques.

In various embodiments, the ends of the optical fiber 801 are terminated by the optical termination pad 804 and the optical coupler 803 according to well known techniques to facilitate connecting and disconnecting the first optical response fiber 805 and the second optical response fiber 806 from the outer package 809. In various embodiments, the optical signature measuring device 807 is an optical time domain reflectometer, an optical spectral analyzer, or a polarization meter. The optical signature measuring device 807 measures the optical signature of the optical fiber 801 received via the first optical response fiber 805 and the second optical response fiber 806. In various embodiments, the optical signature of the optical fiber 801 is measured by the optical signature measuring device 807 and recorded on the RFID tag 810 or on a computer readable storage medium according to well known techniques.

When the optical fiber carrier 802 is fastened to the inner packages 808 as described above, the optical fiber 801 is conformed to the inner packages 808. The bending of the optical fiber 801 resulting from conforming to the inner packages 808 results in a unique arrangement of the optical fiber 801. As long as the arrangement of the optical fiber 801 remains unchanged after being conformed to the inner packages 808, the optical signature of the optical fiber 801 does not change, at least within a tolerance allowing for measurement and environmental effects such as temperature, humidity, barometric pressure, and vibration. However, if the arrangement of the optical fiber 801 is changed, for example, by removing at least a portion of the optical fiber carrier 802 from the inner packages 808, then the optical signature of the optical fiber 801 changes. Because the arrangement of the optical fiber 801 may not be reproduced exactly once it has been changed, the optical signature of the optical fiber 801 will be different from the optical signature when the optical fiber carrier 802 was originally fastened to the inner packages 808, even if the optical fiber carrier 802 is carefully refastened to the inner packages 808 to avoid any visual signs of tampering.

The change in the optical signature of the optical fiber 801 may be detected, for example, by comparing the optical signature of the optical fiber 801 measured after the optical fiber carrier 802 is fastened to the inner packages 808 and the optical signature of the optical fiber 801 measured at a later time, for example, when the package 801 is delivered to a warehouse, a distribution center, or a customer. The difference calculated by subtracting the optical signature measurements represents the level of confidence that tampering has occurred. In various embodiments, the optical signature measurements are corrected to compensate for variations in temperature, humidity, and barometric pressure to discriminate against false alarms.

In one embodiment, the difference between the optical signature measurements is compared to a threshold to discriminate against false alarms from environmental effects such as temperature, humidity, barometric pressure, and vibration. If the difference exceeds the threshold, a tampering indicator is generated to indicate that the inner packages 808 were most likely subjected to tampering.

In another embodiment, the difference between the optical signature measurements is scaled or normalized according to well known mathematical techniques to generate a tampering indicator as a true/false signal such as an audible or visual alarm to indicate that the inner packages 808 were most likely subjected to tampering. In a further embodiment, the tampering indicator is generated as a variable to indicate a level of confidence that the inner packages 808 were subjected to tampering.

In one embodiment, a method includes conforming an arrangement of an optical fiber to an object to detect tampering with the object when the optical fiber arrangement is changed, measuring an optical signature of the optical fiber arrangement in a first measurement, measuring the optical signature of the optical fiber arrangement at a time after the first measurement in a second measurement, and comparing the first and second measurements to detect tampering with the object from a change in the optical fiber arrangement.

Figure 9:
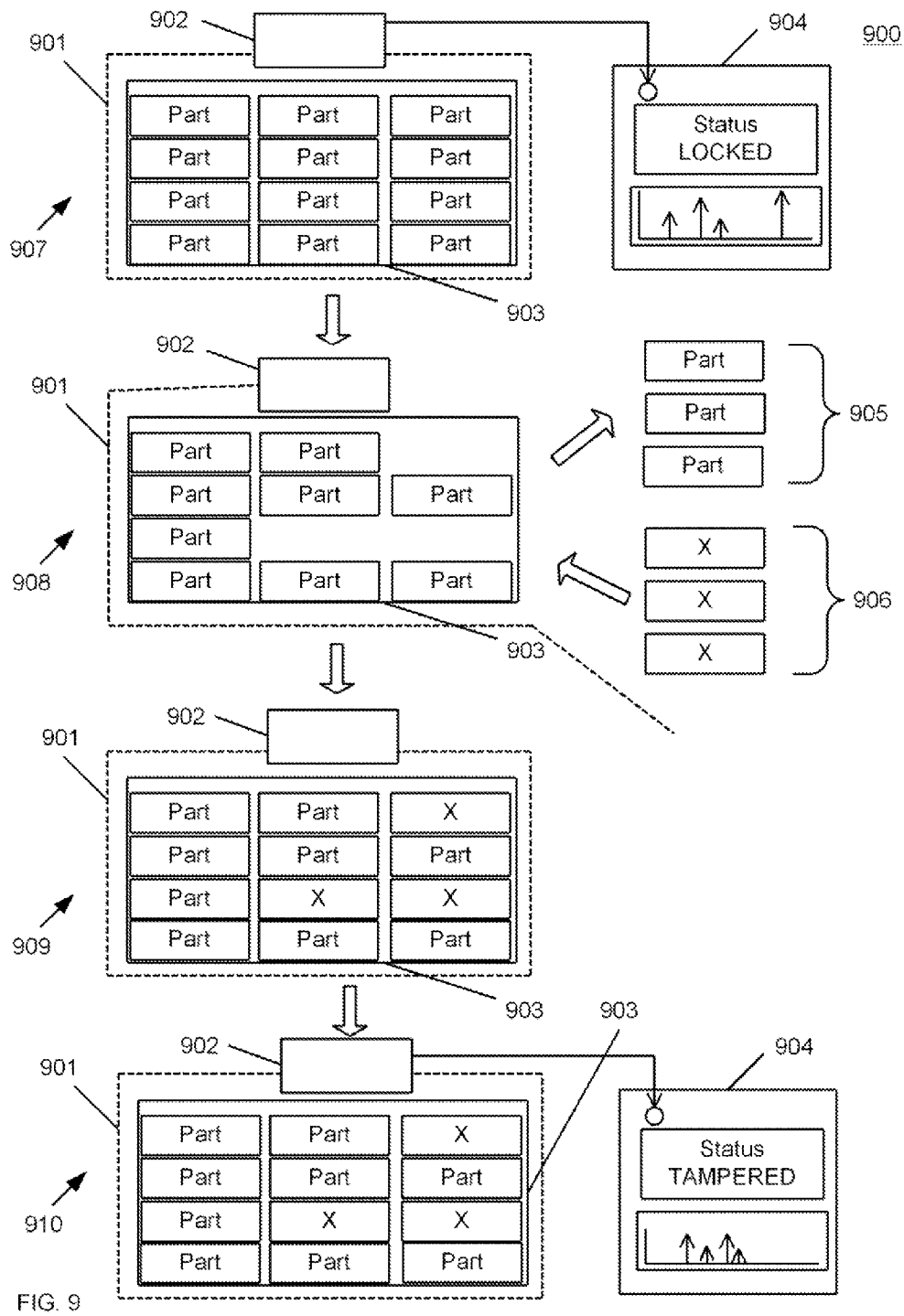
FIG. 9 illustrates an embodiment of a method of detecting tampering with the shipment of parts in FIG. 8.

FIG. 9 illustrates an embodiment of a method 900 of detecting tampering with the shipment of parts in FIG. 8. Shown in FIG. 9 are a shipping container 901, an optical signature measurement port 902, a shipment of parts 903, an optical signature measuring device 904, genuine parts 905, counterfeit parts 906, a first optical signature measurement event 907, a tampering event 908, a resealing event 909, and a second optical signature measurement event 910.

In FIG. 9, the shipment of parts 903 is loaded into the shipping container 901. In one embodiment, the shipping container 903 is an intermodal freight container. In various embodiments, the shipping container 903 is a semi trailer or a fixed storage container, such as a building or a vault. In one embodiment, the optical signature measurement port 902 is an enclosure mounted on the outside of the shipping container 901 that includes optical fiber connections to the optical shield applied to the shipment of parts as described above with reference to FIG. 8 for connecting and disconnecting the optical signature measuring device 904 to the optical shield.

In the first optical signature measurement event 907, the optical signature measuring device 904 is connected to the optical signature measurement port 902 on the shipping container 901 to measure the optical signature of the optical shield including one or more of the optical response variables as described above with reference to FIGS. 1-5. The measurements are recorded by the optical signature measuring device 904, for example, on an RFID tag or on a computer readable medium, and the optical signature measuring device 904 indicates the "LOCKED" status. The optical signature measuring device 904 is disconnected from the optical signature measurement port 902, and the shipping container 903 is shipped to a customer.

In the tampering event 908, the shipping container 901 is intercepted and opened on its way to the customer. Some of the genuine parts 905 in the shipment of parts 903 are removed and replaced with the counterfeit parts 906.

In the resealing event 909, the shipping container 901 is closed and resealed to appear intact.

In the second optical signature measurement event 910, the shipping container 903 arrives at the customer's location. The measurements from the first optical signature measurement event 907 are received at the customer's location, for example, from an RFID tag accompanying the shipment of parts 903 or from another data communication device, such as a computer readable medium or a computer.

An identical optical signature measuring device 904 is connected to the optical signature measurement port 902 to perform a second optical signature measurement upon arrival of the shipping container 903 at its destination. The optical signature measuring device 904 displays the measurements from the second optical signature measurement and compares those to the measurements recorded from the first optical signature measurement, for example, on an RFID tag, a computer readable medium, or by a computer. Due to the tampering event 908, the optical signature of the optical shield was changed. The optical signature measuring device 904 compares the measurements from the first optical signature measurement and the second optical signature measurement and calculates the difference between the measurements. In one embodiment, when the difference in the optical signature measurements exceeds a threshold that allows for measurement error and environmental effects of, for example, temperature, humidity, barometric pressure, and vibration, the optical signature measuring device 904 generates a corresponding tampering indicator from the difference and displays the "TAMPERED" status. When the difference does not exceed the threshold, the optical signature measuring device 904 generates a corresponding tampering indicator from the difference in the optical signature measurements and displays the "LOCKED" status.

Figure 10:
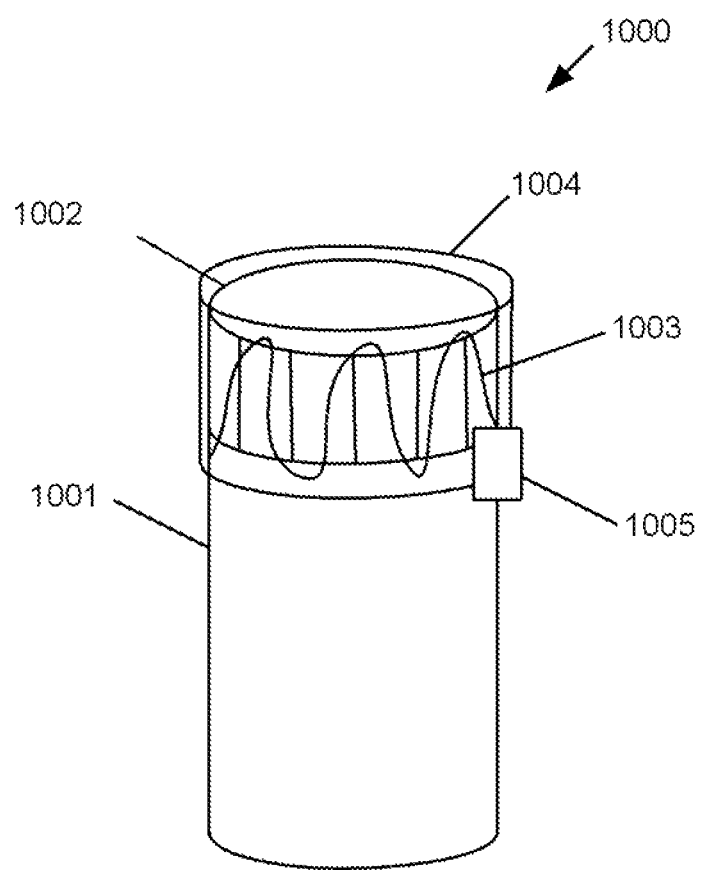
FIG. 10 illustrates an embodiment of an optical shield for a medicine container.

FIG. 10 illustrates an embodiment of an optical shield for a medicine container 1000. Shown in FIG. 10 are a container bottle 1001, a container cap 1002, an optical fiber 1003, an optical fiber carrier 1004, and an optical fiber coupler 1005.

In FIG. 10, the medicine container 1000 may be, for example, a common plastic container used to package tablets, capsules, and liquids. In one embodiment, the container cap 1002 is a plastic cap that closes the container bottle 1001. In various embodiments, the optical fiber carrier 1004 is made of a shrink wrap material in a cylindrical shape that conforms the optical fiber 1003 to a junction of the container bottle 1001 and the container cap 1002. In one embodiment, the optical fiber 1003, the optical fiber carrier 1004, and the optical fiber coupler 1005 are made as described above with reference to FIG. 7. The optical fiber coupler 1005 includes a fiber optic connector to facilitate connecting and disconnecting the optical fiber 1003 from an optical signature measuring device to detect tampering as described above with reference to FIG. 9.

In the context of the description of the embodiments and the claims presented in this application, the term "optical fiber" includes multiple optical fibers. The term "tampering" as used herein means attempting to gain unauthorized access to an object, typically for the purpose of removing it, replacing it with a counterfeit, or altering its performance from its intended purpose. The term "computer" includes special purpose processors, embedded computers, microprocessors, servers, and other devices capable of executing instructions such as arithmetic and logical operations. The term "computer readable storage medium" includes magnetic tape or disk media, flash drives, read only memory (ROM), random access memory (RAM), servers, Internet cloud servers, secure servers, disk drives, compact disks (CDs), digital video disks (DVDs), solid state drives, and other devices capable of storing information descriptive of instructions such as arithmetic and logical operations as well as information representative of tangible and intangible subject matter, including measurements of optical signatures. A secure server is a web server that supports a security protocol that encrypts and decrypts message traffic to protect against third party tampering.

The specific embodiments and applications thereof described above are for illustrative purposes only and do not preclude modifications and variations made within the scope of the following claims.

What is claimed is:

1. A system comprising:
a container having multiple parts, at least one of the multiple parts arranged within an expanded material;
an optical fiber with a first end and a second end, the optical fiber conformed by the expanded material such that the optical fiber is physically altered when the at least one of the multiple parts is tampered with;
a detachable light source configured to emit a light pulse, the optical fiber configured to receive the light pulse at the first end and emit an optical signature at the second end;
a detachable optical spectral analyzer configured to capture a current optical signature from the second end, the optical spectral analyzer in communication with a data store, the optical spectral analyzer comprising a processor configured to:
retrieve a stored optical signature from the data store, the stored optical signature captured from the second end when the light pulse was applied to the first end prior to the detachable optical spectral analyzer capturing the current optical signature from the second end,
determine whether a difference between the current optical signature, captured from the second end of the optical fiber and resulting from the light pulse at the first end, and the stored optical signature, captured from the second end of the optical fiber and resulting from the light pulse at the first end, exceeds a threshold, and
determine that the at least one of the multiple parts has been tampered with based on the difference exceeding the threshold.

2. The system of claim 1, wherein the first end and the second end are connected to an optical coupler, the detachable optical spectral analyzer configured to capture the current optical signature from the optical coupler.

3. The system of claim 1, wherein the optical fiber comprises one of a single-mode optical fiber and a multi-mode optical fiber.

4. The system of claim 1, wherein the expanded material comprises at least one of bubble wrap, expanding foam, and plastic air bags.

5. The system of claim 1, wherein the optical fiber comprises at least one of a bend, a curve, a series of curves, a spiral, and a fracture.

6. The system of claim 1, wherein the container comprises one of a regular slotted container, an intermodal freight container, a semi trailer, a building, a vault, a document, and a container closed by a container cap.

7. The system of claim 1, wherein the data store is a tag.

8. The system of claim 7, wherein the tag is attached to the container.

9. The system of claim 1, wherein the processor is configured to measure, from the current optical signature, at least one of bending loss, fracture reflections and chromatic, modal, polarization or four-wave mixing mode dispersions.

10. The system of claim 1, wherein the detachable light source is configured to emit another light pulse different than the light pulse.

11. The system of claim 1, wherein the detachable light source is at least one of a light emitting diode (LED), a semiconductor laser, and a vertical-cavity surface-emitting laser (VCSEL).

12. A method comprising:
capturing, at a detachable optical spectral analyzer, an initial optical signature from a second end of an optical fiber while a container is at a first location, the container having multiple parts, at least one of the multiple parts arranged within an expanded material, the optical fiber conformed by the expanded material, the optical fiber physically altered when the at least one of the multiple parts is tampered with, the optical fiber comprising a first end and the second end, the optical fiber configured to receive a light pulse at the first end and emit an optical signature at the second end;
storing, at the detachable optical spectral analyzer, the initial optical signature in a data store;
transporting the container from the first location to a second location;
capturing, at the detachable optical spectral analyzer, a current optical signature from the second end while the container is at the second location;
retrieving, at the detachable optical spectral analyzer, the initial optical signature from the data store;
determining, at the detachable optical spectral analyzer, whether a difference between the current optical signature and the initial optical signature exceeds a threshold; and
determining, at the detachable optical spectral analyzer, that the at least one of the multiple parts has been tampered with based on the difference exceeding the threshold.

13. The method of claim 12, further comprising storing, at the detachable optical spectral analyzer, the current optical signature in the data store.

14. The method of claim 12, further comprising producing, at the detachable optical spectral analyzer, a tampering indication signal based on the difference exceeding the threshold.

15. The method of claim 14, wherein the tampering indication signal is one of a true/false signal and a level of confidence variable.

16. The method of claim 12, wherein the threshold exceeds a value associated with a false alarm.

17. The method of claim 16, wherein the false alarm is indicative of at least one of measurement error and environmental effects comprising at least one of temperature, humidity, barometric pressure, and vibration.

18. The method of claim 12, further comprising retrieving, at the detachable optical spectral analyzer, the stored optical signature from the data store via the Internet.

* * * * *